United States Patent
Wu et al.

(10) Patent No.: US 8,958,363 B2
(45) Date of Patent: Feb. 17, 2015

(54) PROFILE-BASED BANDWIDTH SCHEDULER

(75) Inventors: Xiao Wu, Temecula, CA (US); Bill Hallstrom, Rancho Santa Fe, CA (US)

(73) Assignee: ViaSat, Inc., Carlsbad, CA (US)

( * ) Notice: Subject to any disclaimer, the term of this patent is extended or adjusted under 35 U.S.C. 154(b) by 1475 days.

(21) Appl. No.: 12/580,108

(22) Filed: Oct. 15, 2009

(65) Prior Publication Data

US 2010/0091699 A1  Apr. 15, 2010

Related U.S. Application Data (60) Provisional application No. 61/105,625, filed on Oct. 15, 2008.

(51) Int. Cl.
 *H04W 4/00* (2009.01)
 *H04B 7/185* (2006.01)
 *H04W 28/20* (2009.01)

(52) U.S. Cl.
 CPC ........... *H04B 7/18584* (2013.01); *H04W 28/20* (2013.01)
 USPC ........................................................ 370/328

(58) Field of Classification Search
 CPC .......................... H04B 7/18584; H04W 28/20
 USPC ........................................................ 370/328
 See application file for complete search history.

(56) References Cited

U.S. PATENT DOCUMENTS

| | | | |
|---|---|---|---|
| 5,802,106 A | 9/1998 | Packer | |
| 6,018,516 A | 1/2000 | Packer | |
| 6,038,216 A | 3/2000 | Packer | |
| 6,046,980 A | 4/2000 | Packer | |
| 6,115,357 A | 9/2000 | Packer et al. | |
| 6,173,406 B1 * | 1/2001 | Wang et al. | 726/3 |
| 6,205,120 B1 | 3/2001 | Packer et al. | |
| 6,208,640 B1 | 3/2001 | Spell et al. | |
| 6,282,542 B1 | 8/2001 | Carneal et al. | |
| 6,381,228 B1 * | 4/2002 | Prieto et al. | 370/323 |
| 6,412,000 B1 | 6/2002 | Riddle et al. | |
| 6,456,630 B1 | 9/2002 | Packer et al. | |
| 6,463,454 B1 | 10/2002 | Lumelsky et al. | |

(Continued)

FOREIGN PATENT DOCUMENTS

| | | |
|---|---|---|
| IL | 182627 | 9/2012 |
| WO | WO-2006/055944 A2 | 5/2006 |

OTHER PUBLICATIONS

Extended European Search Report mailed in European Patent Application No. 05825156.2 on Mar. 1, 2012, 10 pgs.

(Continued)

*Primary Examiner* — Asad Nawaz
*Assistant Examiner* — Saad A Waqas
(74) *Attorney, Agent, or Firm* — Kilpatrick Townsend & Stockton LLP (57) ABSTRACT

A profile-based scheduler is disclosed. In other embodiments, the profile-based scheduler may profile previously accessed websites and/or FTP sites. In doing so, the profile may compile bandwidth requirements for all such profiled websites and/or FTP sites within a lookup table. When a website and/or FTP site is accessed, the profiler may grant the bandwidth associated with the website or FTP site within the lookup table. In some embodiments, the profiler may create entries not only based on websites and/or FTP sites but may also profile users, TCP connections, web browser configurations and/or web browser types.

19 Claims, 6 Drawing Sheets

(56) References Cited

U.S. PATENT DOCUMENTS

| | | | |
|---|---|---|---|
| 7,116,682 B1 | 10/2006 | Waclawsky et al. | |
| 7,769,863 B2 | 8/2010 | Eidenschink | |
| 8,176,520 B1* | 5/2012 | Mitchell | 725/76 |
| 8,359,387 B2 | 1/2013 | Eidenschink | |
| 8,719,409 B2 | 5/2014 | Eidenschink | |
| 2001/0011300 A1 | 8/2001 | Pitts | |
| 2001/0043617 A1 | 11/2001 | McKinnon et al. | |
| 2001/0048670 A1 | 12/2001 | Kelly et al. | |
| 2001/0053152 A1 | 12/2001 | Sala et al. | |
| 2002/0147770 A1* | 10/2002 | Tang | 709/203 |
| 2002/0178263 A1* | 11/2002 | Hreha et al. | 709/226 |
| 2003/0027522 A1 | 2/2003 | Valdivia et al. | |
| 2003/0081626 A1 | 5/2003 | Naor et al. | |
| 2003/0123394 A1 | 7/2003 | Neale et al. | |
| 2003/0212787 A1 | 11/2003 | Qiu et al. | |
| 2005/0026621 A1 | 2/2005 | Febvre et al. | |
| 2005/0120091 A1* | 6/2005 | Casais et al. | 709/217 |
| 2005/0163059 A1 | 7/2005 | Dacosta et al. | |
| 2005/0207386 A1* | 9/2005 | Schiff | 370/345 |
| 2005/0254426 A1 | 11/2005 | Simonis | |
| 2006/0020700 A1 | 1/2006 | Qiu et al. | |
| 2006/0034167 A1 | 2/2006 | Grice et al. | |
| 2006/0120282 A1 | 6/2006 | Carlson et al. | |
| 2007/0291765 A1* | 12/2007 | Boley et al. | 370/395.21 |
| 2007/0293214 A1* | 12/2007 | Ansari et al. | 455/427 |

OTHER PUBLICATIONS

International Search Report and Written Opinion mailed in International Application No. PCT/US2005/042244 on Nov. 29, 2006, 5 pgs.

International Preliminary Report on Patentability mailed in International Application No. PCT/US2005/042244 on May 22, 2007, 4 pgs.

U.S. Appl. No. 14/221,975, filed Mar. 21, 2014, 22 pgs.

* cited by examiner

PROFILE-BASED BANDWIDTH SCHEDULER

PRIORITY CLAIM

This application claims priority to U.S. Provisional Application No. 61/105,625, entitled PROFILE-BASED BANDWIDTH SCHEDULER, filed on Oct. 15, 2008, which is incorporated by reference in its entirety for any and all purposes.

FIELD OF THE INVENTION

The present invention relates, in general, to satellite communications and, more particularly, to profile-based bandwidth scheduling.

BACKGROUND

Currently, satellite bandwidth grant scheduling methods and systems blindly allocate bandwidth to user terminals and clients without regard for the specific needs or requirements of the URL and/or content which is being downloaded by the user terminal. For example, a scheduler may provide a user terminal bandwidth allocation according to a set amount, but does not gather and utilize historical data or utilize URL or protocol specific data to enhance bandwidth allocation. Therefore, significant bandwidth savings and efficiencies are lost. Hence, improvements in the art are needed.

BRIEF SUMMARY

Embodiments of the present invention are directed to a system for implementing profile-based bandwidth scheduling in a satellite network. The system includes a user terminal configured to send a bandwidth request via a satellite network. The system further includes a gateway in communication with the user terminal via the satellite network. The gateway including a scheduler and a profiler. The scheduler is configured to receive a bandwidth request from a user terminal. The bandwidth request includes an associated URL. The profiler is configured to look up in a grant profile table a grant profile for the associated URL, determine that a grant profile for the associated URL is stored in the grant profile table, and select the grant profile for the associated URL. The grant profile includes bandwidth allocation requirements. The scheduler is further configured to grant bandwidth to the user terminal according to the bandwidth allocation requirements included in the grant profile for the associated URL.

Another embodiment is directed to a method of implementing profile-based bandwidth scheduling in a satellite network. The method includes receiving, at a scheduler, a bandwidth request from a user terminal. The bandwidth request includes an associated URL. The method further includes looking up, by a profiler system in a grant profile table, a grant profile for the associated URL, determining that a grant profile for the associated URL is stored in the grant profile table, and selecting, by the profiler system, the grant profile for the associated URL. The grant profile includes bandwidth allocation requirements. Further, the method includes granting, at the scheduler, bandwidth to the user terminal according to the bandwidth allocation requirements included in the grant profile for the associated URL In an alternative embodiment, a machine-readable medium is described. The machine-readable medium includes instructions for implementing profile-based bandwidth scheduling in a satellite network. The machine-readable medium includes instructions for monitoring processor and/or network resources and determining that the resources are idle, and accessing a grant profile table to select a grant profile of a URL. The grant profile includes bandwidth requirements for accessing the URL. The machine-readable medium further includes instructions for accessing the URL, monitoring bandwidth requirements for accessing the URL, and updating the bandwidth requirements for accessing the URL which are the monitored bandwidth requirements of accessing the URL.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It should be understood that various changes may be made in the function and arrangement of elements without departing from the spirit and scope of the invention as set forth in the appended claims.

Aspects of the disclosure relate to a profile-based scheduler. The profile-based scheduler may profile previously accessed websites and/or FTP sites, and create a profile which compiles a bandwidth listing for all such profiled websites and/or FTP sites within a lookup table. When a website and/or FTP site is accessed, the profiler may grant the bandwidth associated with the website or FTP site within the lookup table. In some embodiments, the profiler may create entries not only based on websites and/or FTP sites but may also based on users, TCP connections, web browser configuration, and/or web browser types. Hence, a more tailored and efficient scheduling of bandwidth may be achieved.

Figure 1:
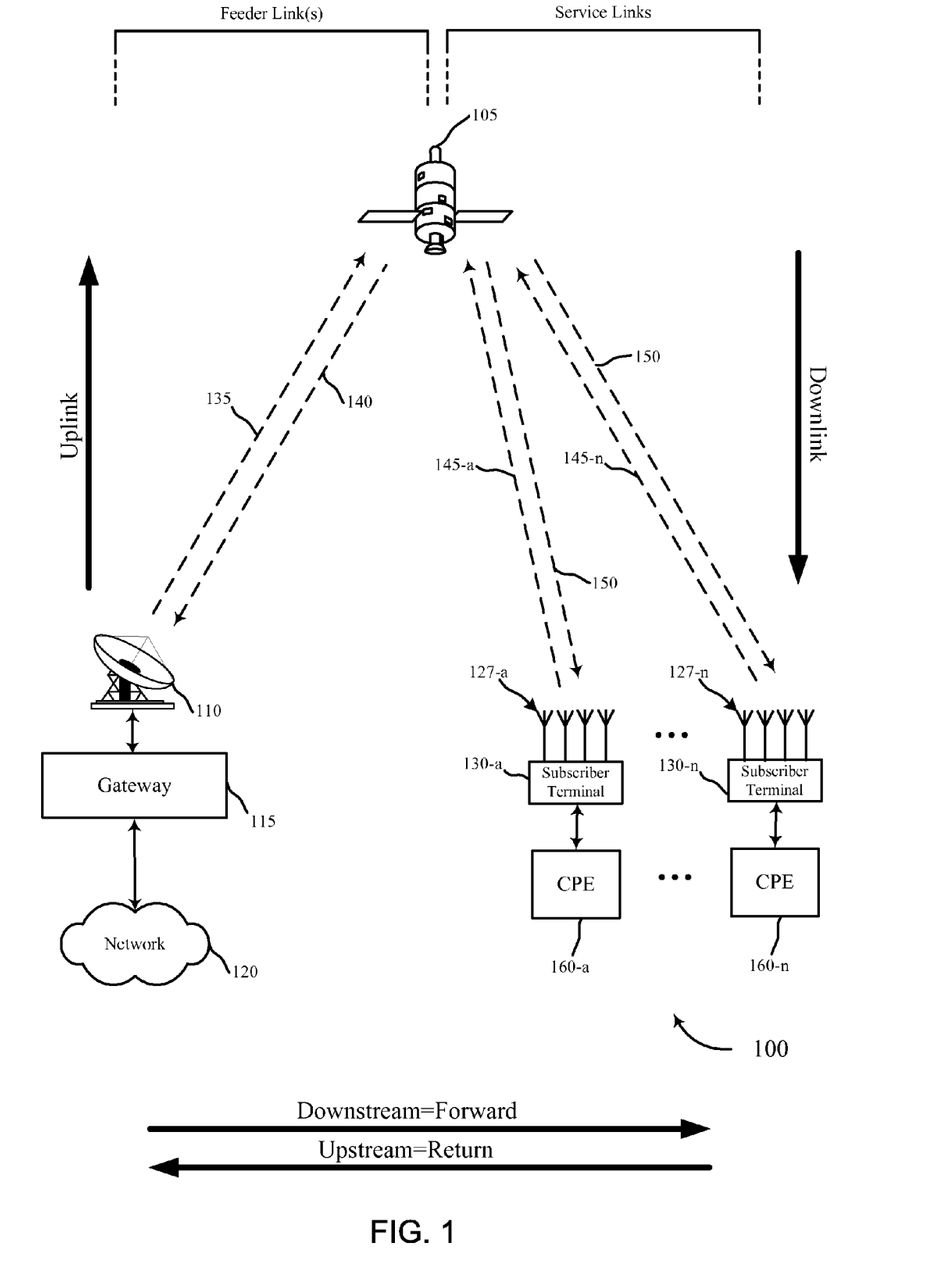
FIG. 1 is a block diagram illustrating a satellite communications system, which can be used in accordance with various embodiments of the invention.

Embodiments of the present disclosure may be used within a satellite system, for example, the satellite system shown in FIG. 1. In some embodiments, Gateway 115 is coupled with a network 120, for example, the Internet. Gateway 115 uses a satellite dish 110 to bi-directionally communicate with satellite 105 on a feeder link. An upstream forward link 135 communicates information from Gateway 115 to satellite 105, and a downstream return link 140 communicates information from satellite 105 to Gateway 115. Although not shown, there may be a number of SMTSs 115 in the system 100.

In some embodiments, satellite 105 could perform switching or be a bent-pipe. Information bi-directionally passes through the satellite 105. Satellite 105 could use antennas or phased arrays when communicating. The communication could be focused into spot beams or more broadly cover a bigger geographical area, for example, the entire continental U.S. (CONUS). Satellites 105 have trouble reaching subscriber terminals 130 through foliage or other obstructions. At certain frequencies, even weather and other atmospheric disturbances can cause a satellite signal to fade.

Subscriber terminals 130 in some embodiments may be bi-directionally coupled with satellite 105 to provide connectivity with network 120. Each subscriber terminal 130 can receive information with a shared forward downlink 150 from satellite 105, and transmitted information may be sent on a number of return uplinks 145. Each subscriber terminal 130 can initiate a return uplink 145 to send information upstream to the satellite 105 and ultimately to the Gateway 115.

In some embodiments satellite system 100 may include multiple antennas on subscriber terminal 130. In some embodiments, subscriber terminal 130 can be in a fixed location or mobile. In some embodiments, subscriber terminal 130 may interact with a single transceiver in satellite 105. Other embodiments of subscriber terminal 130 may interact with multiple transceivers that may be oribitally located or non-orbitable (e.g., air, ground or sea-based). Some embodiments of subscriber terminal 130 allow switching between these modes.

In some embodiments, multiple subscriber terminal 130 may request information from network 120 through Gateway 115 and satellite 105. Uplink bandwidth may be assigned to each subscriber terminal based on requests from the various subscriber terminals using, for example, a scheduler providing demand assigned multiple access (DAMA) or EMSS or other scheduling techniques. That is, in some embodiments, data may be transmitted from Gateway 115 through satellite 105 to one of the subscriber terminals 130 using bandwidth requested from the subscriber terminal 130 and allocated by a scheduler at Gateway 115. Once allocated, the bandwidth may not be used to communicate with other subscriber terminals. When the bandwidth has been used, the bandwidth is de-allocated from the subscriber terminal 130.

Figure 2:
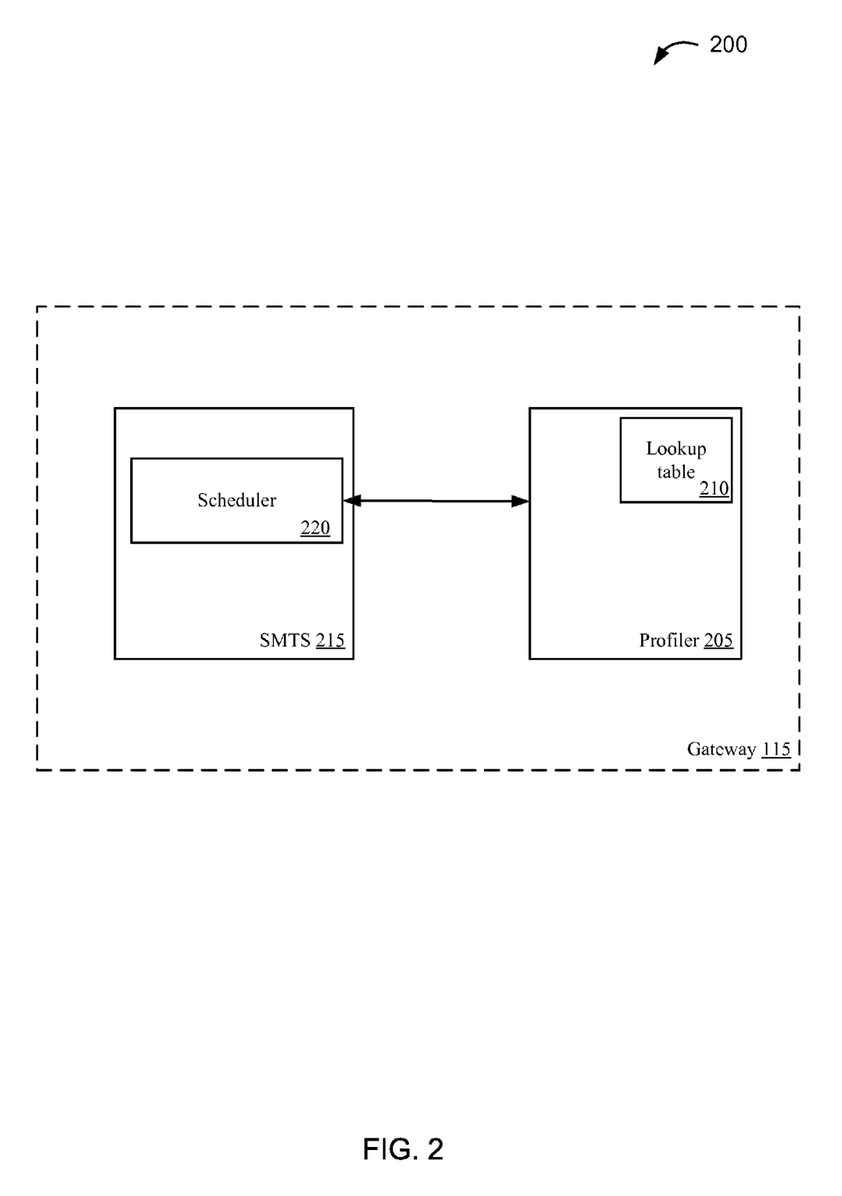
FIG. 2 is a block diagram illustrating an SMTS which can be used in accordance with various embodiments of the invention.

FIG. 2 shows a block diagram of portions of a Gateway 115 according to one embodiment. Various other components may also be included. Moreover, such components may be arranged in any configuration. In yet other embodiments, some components may be positioned external to the Gateway 115.

As shown, the Gateway 115 may receive a bandwidth request from a subscriber terminal 130 through antenna 110. The bandwidth request is sent to scheduler 220. In some embodiments, if the bandwidth request includes a URL request, the bandwidth request is sent to the profiler 205. The profiler 205 may then determine whether the URL in the bandwidth request is listed in lookup table 210.

Lookup table 210 may provide bandwidth usage amounts for URLs. In some embodiments, lookup table 210 may include historical average bandwidth requirements for URLs. In yet other embodiments, lookup table 210 may also include bandwidth requirements for URLs for different web browsers. In yet other embodiments, lookup table 210 may include the upstream grant profile associated with the requested URL. For example, the grant profile may detail that the subscriber terminal needs X bytes for A seconds, then needs Y bytes for B seconds, and then Z bytes for C seconds. In some embodiments, if the URL is not found in lookup table 210, then the profiler may return a default profile. In one embodiment, the default profile may be a demand assigned multiple access (DAMA) or enhanced mobile satellite services (EMSS) scheduling models. In other embodiments, profiler 205 may send a bandwidth request to the scheduler 220 included in SMTS 215 if the URL is not in the lookup table.

In some embodiments, lookup table 210 may be dynamically populated. That is, the profiler 205 and/or scheduler 220 may monitor the bandwidth requirements for specific URLs and/or for specific web browsers. In doing so, the profiler 205 and/or scheduler 220 may add entries to the lookup table 210 and/or modify entries in the lookup table 210. Bandwidth requirements listed in the lookup table may be historical averages; moving averages; or the last known bandwidth requirement. Moreover, in some embodiments, if a URL is not requested over a certain period of time the URL's listing in the lookup table 210 may expire or may be deleted. In yet other embodiments, the profiler 205 may also update the lookup table 210 by checking the bandwidth requirements for URLs within the lookup table 210.

In yet other embodiments, FTP and/or other applications or protocols may be profiled. In such situations, the profiler 205 may return a profile, for example, based on the FTP address. A generic FTP profile may also be used.

In yet other embodiments, the subscriber terminal 130, for example, at the modem, may monitor traffic. For example, the subscriber terminal 130 may monitor when a user accesses a website. The subscriber terminal 130 may then send a packet to the SMTS 215 that includes the URL, browser configuration, browser type, number of TCP connections, etc. The profiler 205 may use any combination of this information to provide bandwidth requirements. In some embodiments, the profiler 205 may be an application running on a server at the SMTS 215 or a standalone computer and/or processor.

Figure 3:
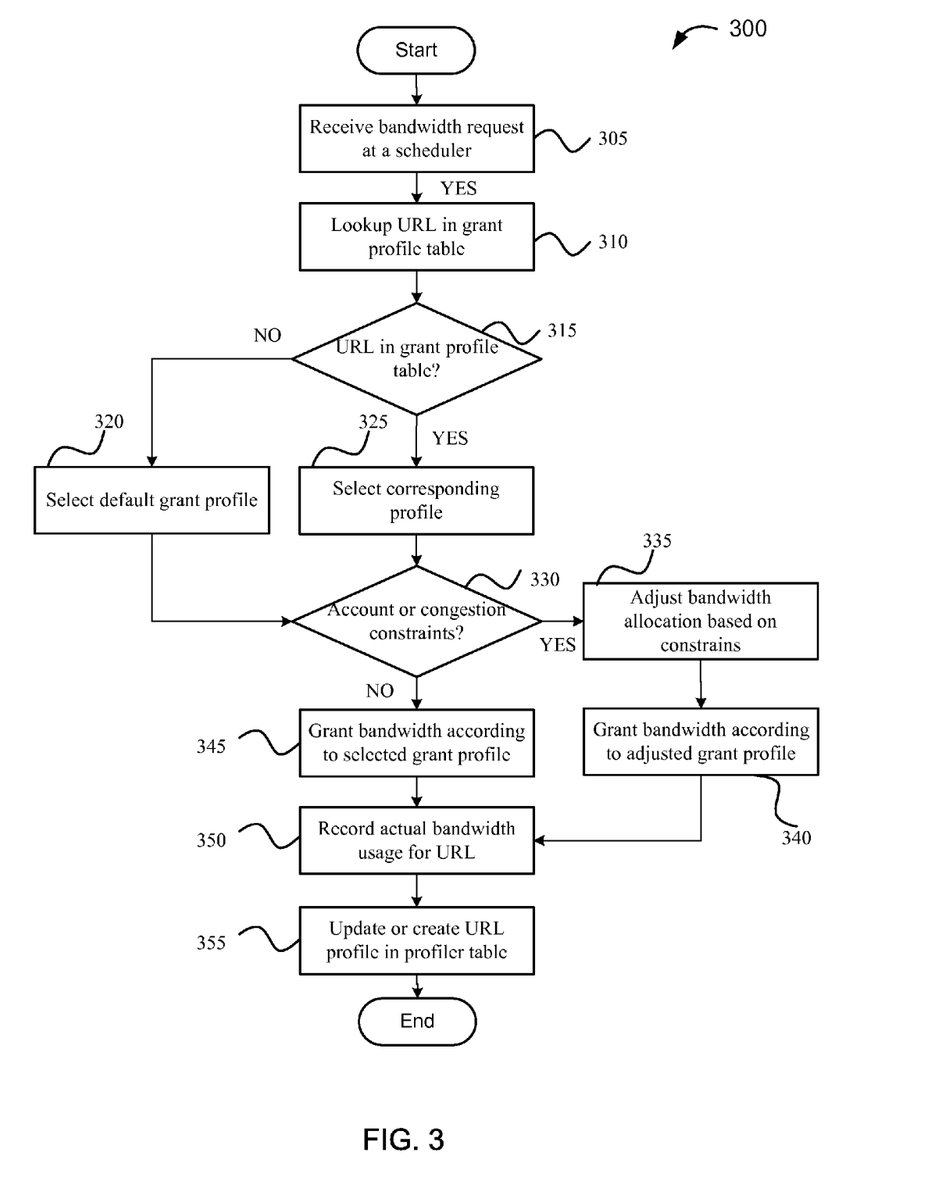
FIG. 3 is a flow diagram illustrating a method of implementing profile-based bandwidth scheduling, according to one embodiment of the present invention.

FIG. 3 shows a flowchart for providing bandwidth grants using a profiler according to one embodiment. At process block 305, a bandwidth request is received at a scheduler from, for example, a client's browser. In one embodiment, the bandwidth request includes an associated URL. At process block 310, a profiler performs a lookup of the URL in a grant profile table to find a profile entry associated with the URL.

At decision block 315, if the lookup table does not include a profile associated with the requested URL, then a default profile is selected to handle the bandwidth request (process block 320). Alternatively, if a grant profile associated with the URL is found in the grant profile lookup table, then the grant profile is selected (process block 325).

Furthermore, at decision block 330, a determination is made whether a service account associated with the client of the request constrains and/or restricts the available bandwidth. For example, the client's service plan may only allow for a maximum bandwidth amount, but the grant profile for the URL calls for a higher bandwidth allocation. In addition, a determination is made whether the link congestion is such that is will restrict the available bandwidth. For example, if the congestion on the link reaches a threshold amount, all or some of the grant profiles (including the default profile) may be uniformly adjusted up or down, depending on the amount or lack of congestion.

Accordingly, if an account or congestion constraint exists, then at process block 335 the bandwidth allocation from the selected grant profile (either URL specific or default profile) is adjusted. Then, at process block 340, the scheduler may grant bandwidth according to the adjusted grant profile. Alternatively, if there are not any constraints (account, congestion, or otherwise), then at process block 345, the scheduler may grant bandwidth to the client according to the selected profile.

Furthermore, at process block 350, the actual bandwidth usage for the URL is recorded. For example, the URL profile or default profile may grant X amount of bandwidth for the URL, but Y amount of bandwidth may actually be used. Thus, at process block 355, the grant profile for the URL may be updated to more accurately reflect the bandwidth requirements for the URL. Alternatively, if no profile previously existed for the URL, then a new grant profile for the URL may be created and stored in the grant profile lookup table.

Accordingly, the bandwidth requirements associated with each profile for each URL may be adjusted based on each subsequent client's actual bandwidth usage from the URL. For example, user 1 may download URL 1 and require (X-Y) amount of bandwidth, while the grant profile provided X amount of bandwidth. Accordingly, the profile for the URL would be adjusted to (X-Y). Assuming that 5 minutes (or any given amount of time) later, user 2 downloads URL 1 using the grant profile and only uses (X-Y-Z) amount of bandwidth, the grant profile would be further adjusted to grant (X-Y-Z) bandwidth. Subsequently, the bandwidth provided by the grant profile for URL 1 will be adjusted each time a user downloads URL 1, and as such the grant profile is improved.

Furthermore, each grant profile entry in the lookup table may have a time-to-live (TTL) amount which may either trigger the entry to be removed from the table, or trigger a refresh of the entry. The TTL may be a default time period, or may be unique to each grant profile based in part on the URL content and activity. For example, the content at a news website may significantly change every hour, and so the grant profile for that URL may have a one hour TTL, whereas a bank website may only change every 2 weeks, so that URL would have a 2 week TTL. Alternatively, an average of a number of websites' refresh/change rates may be used to determine a default TTL value.

Figure 4:
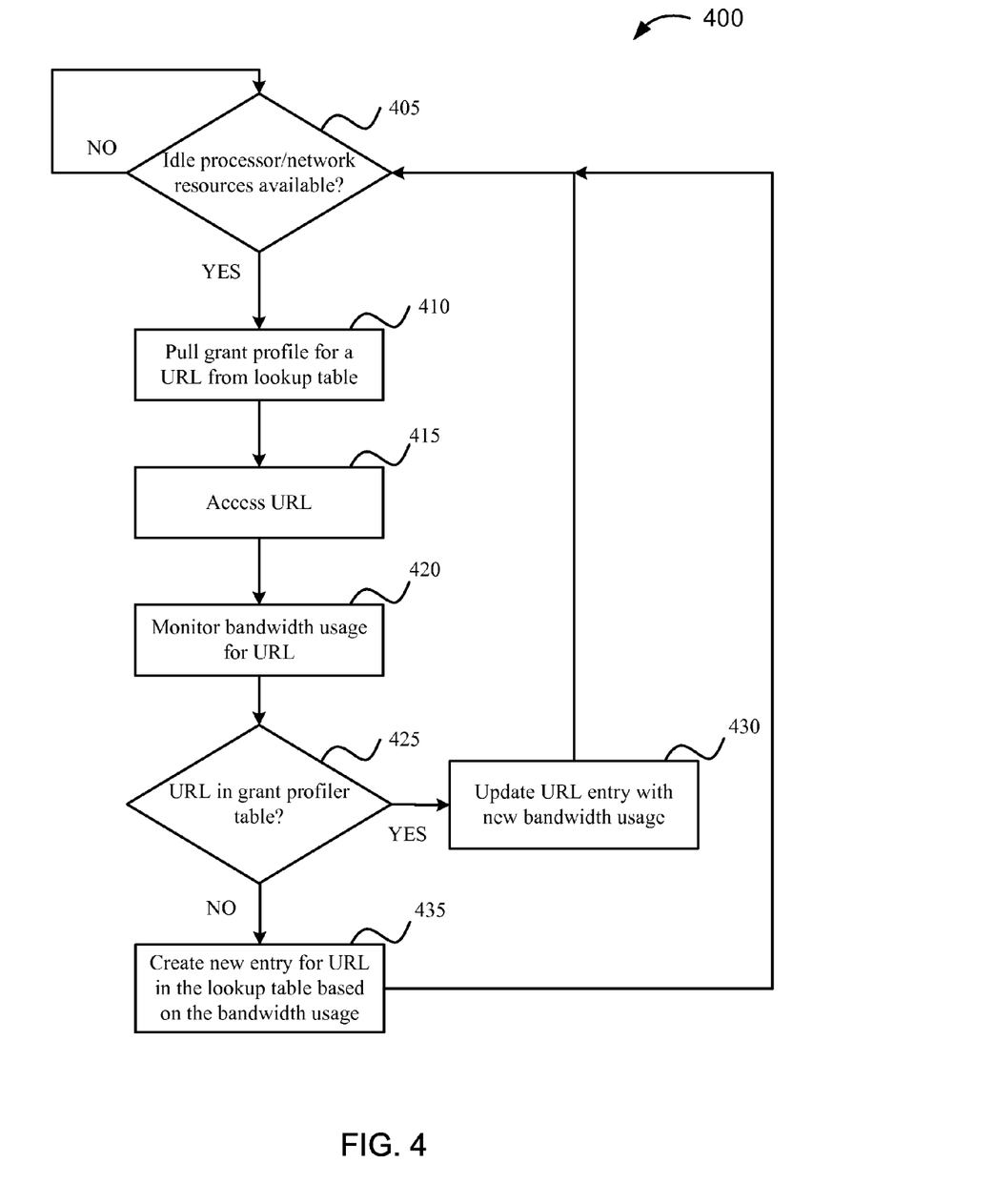
FIG. 4 is a flow diagram further illustrating a method of implementing profile-based bandwidth scheduling, according to one embodiment of the present invention.

Additionally, a background and/or automated refresh mechanism may be in place to maintain accurate and up-to-date grant profiles. FIG. 4 shows a flowchart for automatically updating the grant profiles within the lookup table according to one embodiment. The process begins by determining whether idle network and/or processor resources are available (decision block 405). In some embodiments, a system may wait until a time when the network and/or the processor resources are available (e.g., during the night, at low traffic times, etc.) for profiling new URLs and/or updating URL grant profiles. In a further embodiment, the updating and new profiling may be in accordance with a schedule (e.g., once a day, once a week, etc.). In some embodiments, block 405 may not be included in method 400.

At process block 410, a grant profile for a URL is pulled from grant profile lookup table. In some embodiments, a URL is pulled sequentially. The associated URL is determined. In other embodiments, a grant profile is pulled from the lookup table based on the time and/or date of the last update and/or last access of the URL. In yet other embodiments, the URL is pulled randomly or in serial sequence from the lookup table.

The URL may then be accessed at block 415 and the bandwidth usage for the URL is monitored at process block 420.

At decision block 425, a determination is made whether an entry for the URL is in the grant profile lookup table. If an entry already exists for the URL, then at process block 430, the entry is updated with new bandwidth usage information. If no entry exists, then at process block 435, a new grant profile for the URL is created and stored in the grant profile lookup table. Then, method 400 continues back to process block 405 to continue to monitor processor and network recourses.

Figure 5:
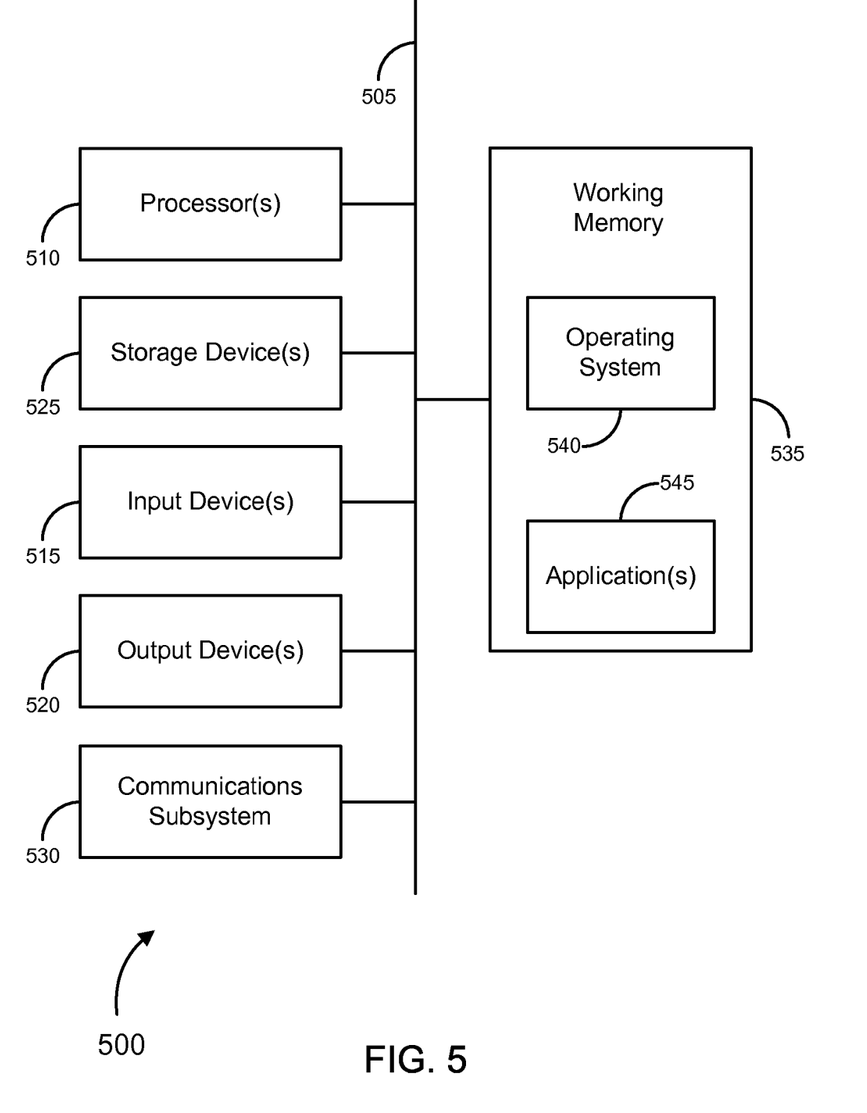
FIG. 5 is a generalized schematic diagram illustrating a computer system, in accordance with various embodiments of the invention.

FIG. 5 provides a schematic illustration of one embodiment of a computer system 500 that can perform the methods of the invention. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements can include one or more processors 510, including without limitation one or more general-purpose processors and/or one or more special-purpose processors (such as digital signal processing chips, graphics acceleration chips, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage and/or can include, without limitation, a disk drive, a drive array, an optical storage device, a solid-state storage device such as a random access memory ("RAM") and/or a read-only memory ("ROM"), which can be programmable, flash-updateable and/or the like. The computer system 500 might also include a communications subsystem 530, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 530 may permit data to be exchanged with a network (such as the network described below, to name one example), and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540 and/or other code, such as one or more application programs 545, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 500) to perform methods of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another machine-readable medium, such as one or more of the storage device(s) 525. Merely by way of example, execution of the sequences of instructions contained in the working memory 535 might cause the processor(s) 510 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 500, various machine-readable media might be involved in providing instructions/code to processor(s) 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 525. Volatile media includes, without limitation, dynamic memory, such as the working memory 535. Transmission media includes coaxial cables, copper wire and fiber optics, including the wires that comprise the bus 505, as well as the various components of the communication subsystem 530 (and/or the media by which the communications subsystem 530 provides communication with other devices). Hence, transmission media can also take the form of waves (including without limitation, radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc., carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
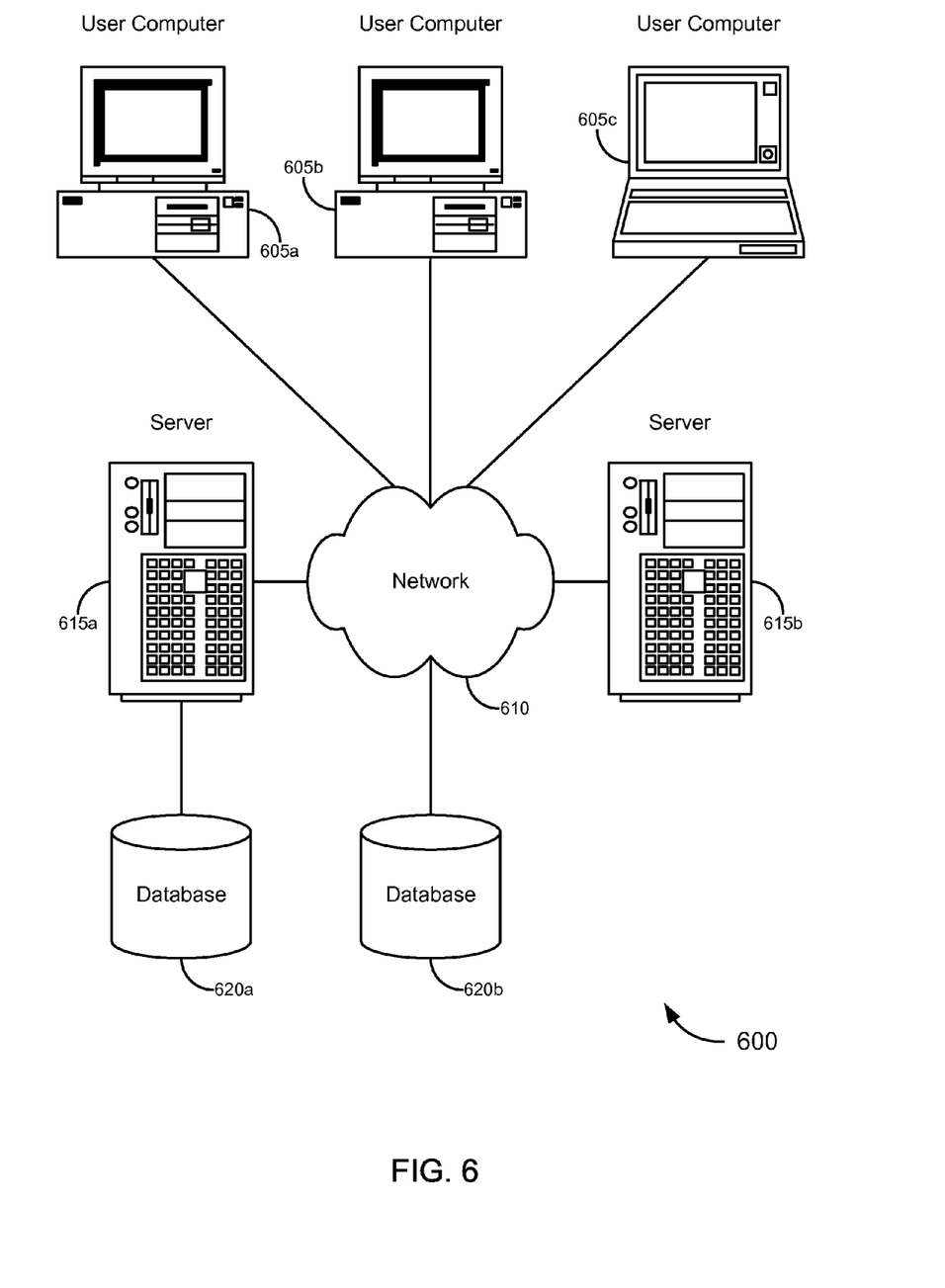
FIG. 6 is a block diagram illustrating a networked system of computers, which can be used in accordance with various embodiments of the invention.

A set of embodiments comprises systems for implementing dedicated shared byte caches. Merely by way of example, FIG. 6 illustrates a schematic diagram of a system 600 that can be used in accordance with one set of embodiments. The system 600 can include one or more user computers 605. The user computers 605 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 605 can also have any of a variety of applications, including one or more applications configured to perform methods of the invention, as well as one or more office applications, database client and/or server applications, and web browser applications. Alternatively, the user computers 605 can be any other electronic device, such as a thin-client computer, Internet-enabled mobile telephone, and/or personal digital assistant (PDA), capable of communicating via a network (e.g., the network 610 described below) and/or displaying and navigating web pages or other types of electronic documents. Although the exemplary system 600 is shown with three user computers 605, any number of user computers can be supported.

Certain embodiments of the invention operate in a networked environment, which can include a network 610. The network 610 can be any type of network familiar to those skilled in the art that can support data communications using any of a variety of commercially available protocols, including without limitation TCP/IP, SNA, IPX, AppleTalk, and the like. Merely by way of example, the network 610 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 615. Each of the server computers 615 may be configured with an operating system, including without limitation any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 may be a web server, which can be used, merely by way of example, to process requests for web pages or other electronic documents from user computers 605. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 605 to perform methods of the invention.

The server computers 615, in some embodiments, might include one or more application servers, which can include one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configurator, database clients, API clients, web browsers, etc.) running on a user computer 605 and/or another server 615. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 605 via a web server (as described above, for example). Similarly, a web server might receive web page requests and/or input data from a user computer 605 and/or forward the web page requests and/or input data to an application server. In some cases a web server may be integrated with an application server.

In accordance with further embodiments, one or more servers 615 can function as a file server and/or can include one or more of the files (e.g., application code, data files, etc.) necessary to implement methods of the invention incorporated by an application running on a user computer 605 and/or another server 615. Alternatively, as those skilled in the art will appreciate, a file server can include all necessary files, allowing such an application to be invoked remotely by a user computer 605 and/or server 615. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620. The location of the database(s) 620 is discretionary: merely by way of example, a database 620a might reside on a storage medium local to (and/or resident in) a server 615a (and/or a user computer 605). Alternatively, a database 620b can be remote from any or all of the computers 605, 615, so long as the database can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of implementing profile-based bandwidth scheduling in a satellite network, the method comprising:
   receiving, at a scheduler, a bandwidth request from a user terminal, wherein the bandwidth request includes an associated uniform resource locator (URL);
   looking up, by a profiler system in a grant profile table, a grant profile for the associated URL, wherein the grant profile table comprises a plurality of URLs as well as an amount of bandwidth required and a time interval for which the amount of bandwidth is required for each URL of the plurality of URLs;

determining that a grant profile for the associated URL is stored in the grant profile table by identifying the associated URL in the grant profile table;

selecting, by the profiler system, the grant profile for the associated URL, wherein the grant profile includes bandwidth allocation requirements for the associated URL, the bandwidth allocation requirements comprising the amount of bandwidth required and the time interval for which the amount of bandwidth is required for the associated URL; and granting, at the scheduler, bandwidth to the user terminal for the time interval according to the bandwidth allocation requirements included in the grant profile for the associated URL;

wherein the grant profile table further comprises:
for each grant profile associated with each URL of the plurality of URLs, a unique time-to-live amount based on a refresh/change rate of content at each website respectively linked to by each URL of the plurality of URLs and a user activity to access the content, wherein each time-to-live amount triggers the associated grant profile to be refreshed or removed from the grant profile table.

2. A method of implementing profile-based bandwidth scheduling in a satellite network, as in claim 1, further comprising determining congestion on the satellite network has exceeded a congestion threshold.

3. A method of implementing profile-based bandwidth scheduling in a satellite network, as in claim 2, further comprising in response to the congestion on the satellite network exceeding the congestion threshold, adjusting down according to a predetermined amount, the bandwidth allocation requirements of the grant profile for the associated URL.

4. A method of implementing profile-based bandwidth scheduling in a satellite network, as in claim 3, wherein the grant profile table includes a plurality of grant profiles for each of the plurality of URLs.

5. A method of implementing profile-based bandwidth scheduling in a satellite network, as in claim 4, further comprising adjusting down bandwidth requirements of each of the plurality of grant profiles based on the congestion on the satellite network exceeding the congestion threshold.

6. A method of implementing profile-based bandwidth scheduling in a satellite network as in claim 5, wherein the user terminal includes an account bandwidth allocation restriction.

7. A method of implementing profile-based bandwidth scheduling in a satellite network, as in claim 6, further comprising based on the bandwidth allocation requirements of the grant profile for the associated URL exceeding the account bandwidth allocation restriction, adjusting down the bandwidth allocation requirements of the grant profile for the associated URL to at least an amount of the account bandwidth allocation restriction.

8. A method of implementing profile-based bandwidth scheduling in a satellite network, as in claim 1, further comprising recording actual bandwidth requirements for the associated URL as accessed by the user terminal.

9. A method of implementing profile-based bandwidth scheduling in a satellite network, as in claim 8, further comprising updating the bandwidth requirements of the grant profile for the associated URL with the recorded actual bandwidth requirements.

10. A method of implementing profile-based bandwidth scheduling in a satellite network, as in claim 1, further comprising:

granting, at the scheduler, the bandwidth to the user terminal for the time interval according to the bandwidth allocation requirements included in the grant profile for the associated URL after checking an account constraint associated with a client of the user terminal and a congestion constraint that is associated with a communication link, wherein the account constraint is separate from the congestion constraint;

receiving, at the scheduler, a second bandwidth request from the user terminal, wherein the second bandwidth request includes a second associated URL;

determining that the grant profile table does not include a second grant profile for the second associated URL; and in response to determining that the grant profile table does not include the second grant profile for the second associated URL:

selecting a default grant profile;

granting, at the scheduler, a second bandwidth to the user terminal for a second time interval according to the default grant profile;

recording actual bandwidth requirements for the second associated URL as accessed by the user terminal;

based on the actual bandwidth requirements, creating the second grant profile for the associated URL; and storing the second grant profile in the grant profile table.

11. A method of implementing profile-based bandwidth scheduling in a satellite network, as in claim 1, further comprising:

receiving, at the scheduler, a second bandwidth request from the user terminal, wherein the second bandwidth request includes a second associated URL; and determining that the grant profile table does not include a second grant profile for the second associated URL.

12. A method of implementing profile-based bandwidth scheduling in a satellite network, as in claim 11, further comprising in response to determining that the grant profile table does not include the second grant profile for the second associated URL, selecting a default grant profile.

13. A method of implementing profile-based bandwidth scheduling in a satellite network, as in claim 12, wherein the default grant profile comprises demand assigned multiple access (DAMA) or enhanced mobile satellite services (EMSS) scheduling models.

14. A method of implementing profile-based bandwidth scheduling in a satellite network, as in claim 12, further comprising:

recording actual bandwidth requirements for the associated URL as accessed by the user terminal;

based on the actual bandwidth requirements, creating a grant profile for the associated URL; and storing the grant profile in the grant profile table.

15. A system for implementing profile-based bandwidth scheduling in a satellite network, the system comprising:

a user terminal configured to send a bandwidth request via a satellite network; and a gateway in communication with the user terminal via the satellite network, the gateway including a scheduler and a profiler, wherein the scheduler is configured to receive the bandwidth request from a user terminal, wherein the bandwidth request includes an associated uniform resource locator (URL), wherein the profiler is configured to look up in a grant profile table a grant profile for the associated URL, determine that a grant profile for the associated URL is stored in the grant profile table, and select the grant profile for the associated URL, wherein the grant profile includes bandwidth allocation requirements, and wherein the bandwidth allocation requirements comprising an amount of bandwidth required and a time interval for which the amount of bandwidth is required for the associated URL, and wherein the scheduler is further configured to grant bandwidth to the user terminal for the time interval according to the bandwidth allocation requirements included in the grant profile for the associated URL; and wherein the grant profile table further comprises:
for each grant profile associated with each URL of the plurality of URLs, a unique time-to-live amount based on a refresh/change rate of content at each website respectively linked to by each URL of the plurality of URLs and a user activity to access the content, wherein each time-to-live amount triggers the associated grant profile to be refreshed or removed from the grant profile table.

16. A system for implementing profile-based bandwidth scheduling in a satellite network as in claim 15, further comprising an SMTS which includes the scheduler.

17. A non-transitory machine-readable medium for implementing profile-based bandwidth scheduling in a satellite network, having sets of instructions which, when executed by a machine, cause the machine to:

monitor processor and/or network resources and determining that the resources are idle;

access a grant profile table to select a grant profile of a uniform resource locator (URL), wherein the grant profile comprises bandwidth requirements for accessing the URL, and wherein the bandwidth requirements comprising an amount of bandwidth required and a time interval for which the amount of bandwidth is required for the associated URL;

access the URL;

monitor bandwidth requirements of accessing the URL; and update the bandwidth requirements and the time interval for accessing the URL with the monitored bandwidth requirements of accessing the URL;

wherein the grant profile table further comprises:
for each grant profile associated with each URL of the plurality of URLs, a unique time-to-live amount based on a refresh/change rate of content at each website respectively linked to by each URL of the plurality of URLs and a user activity to access the content, wherein each time-to-live amount triggers the associated grant profile to be refreshed or removed from the grant profile table.

18. A machine-readable medium for implementing profile-based bandwidth scheduling in a satellite network, as in claim 17, having sets of instructions which, when executed by the machine, further cause the machine to determine that a grant profile for the URL is not in the grant profile table.

19. A machine-readable medium for implementing profile-based bandwidth scheduling in a satellite network, as in claim 18, having sets of instructions which, when executed by the machine, further cause the machine to create a new grant profile for the URL and store the grant profile in the grant profile table.

* * * * *